US009253480B2

United States Patent
Ohba et al.

(10) Patent No.: US 9,253,480 B2
(45) Date of Patent: Feb. 2, 2016

(54) IMAGE DISPLAY DEVICE, IMAGE DISPLAY METHOD, AND IMAGE CORRECTION METHOD

(71) Applicant: Sony Computer Entertainment Inc., Tokyo (JP)

(72) Inventors: Akio Ohba, Kanagawa (JP); Nobuo Sasaki, Kanagawa (JP); Akihiko Sugawara, Kanagawa (JP); Hiroyuki Segawa, Kanagawa (JP); Tetsugo Inada, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 315 days.

(21) Appl. No.: 13/760,202

(22) Filed: Feb. 6, 2013

(65) Prior Publication Data

US 2013/0147931 A1    Jun. 13, 2013

Related U.S. Application Data

(63) Continuation of application No. PCT/JP2011/001994, filed on Apr. 4, 2011.

(30) Foreign Application Priority Data

Aug. 9, 2010  (JP) ................. 2010-178852

(51) Int. Cl.
H04N 13/04       (2006.01)
G02B 27/22       (2006.01)
(Continued)

(52) U.S. Cl.
CPC ........ H04N 13/0468 (2013.01); G02B 27/2214 (2013.01); H04N 13/0022 (2013.01);
(Continued)

(58) Field of Classification Search
CPC ........... G02B 27/2214; H04N 13/0022; H04N 13/0278; H04N 13/0409; H04N 13/0468; H04N 13/0477; H04N 13/0484; H04N 13/0497; H04N 13/0404; H04N 13/0422
USPC .......................................................... 348/51
See application file for complete search history.

(56) References Cited

U.S. PATENT DOCUMENTS 5,793,341 A  *  8/1998  Omori et al. ...................... 345/8
6,049,424 A     4/2000  Hamagishi
(Continued)

FOREIGN PATENT DOCUMENTS

CN    1845612 A    10/2006
CN    1860503 A    11/2006
(Continued)

OTHER PUBLICATIONS

European Search Report for corresponding EP Application No. 11816192.6, dated Mar. 23, 2015.
(Continued)

Primary Examiner — Shan Elahi
(74) Attorney, Agent, or Firm — Matthew B. Dernier, Esq.

(57) ABSTRACT

A viewpoint detection unit detects a user viewing a stereoscopic image, including a parallax image of a subject as viewed from a predetermined position defined as a reference view position, and tracks a viewpoint of the detected user. A motion parallax correction unit determines, if a speed of movement of the viewpoint becomes equal to or higher than a predetermined level, an amount of motion parallax correction for the parallax image, on the basis of an amount of movement of the viewpoint, so as to generate a stereoscopic image corrected for motion parallax, generates, if the speed of movement of the viewpoint subsequently becomes lower than a predetermined level, a stereoscopic image by changing the amount of motion parallax correction in steps until the parallax image return to parallax images as seen from the reference view position.

9 Claims, 7 Drawing Sheets

(51) Int. Cl.
*H04N 13/00* (2006.01)
*H04N 13/02* (2006.01)

(52) U.S. Cl.
CPC ....... *H04N13/0278* (2013.01); *H04N 13/0409* (2013.01); *H04N 13/0477* (2013.01); *H04N 13/0484* (2013.01)

(56) References Cited

U.S. PATENT DOCUMENTS

| | | | |
|---|---|---|---|
| 6,791,570 B1 | 9/2004 | Schwerdtner | |
| 7,092,003 B1* | 8/2006 | Siegel et al. | 348/47 |
| 7,616,187 B2 | 11/2009 | Kyung-Hoon | |
| 7,692,640 B2 | 4/2010 | Geest | |
| 7,705,876 B2 | 4/2010 | Starkweather | |
| 8,213,711 B2* | 7/2012 | Tam et al. | 382/162 |
| 8,350,896 B2 | 1/2013 | Kawakami | |
| 2005/0089212 A1* | 4/2005 | Mashitani et al. | 382/154 |
| 2006/0038881 A1 | 2/2006 | Starkweather | |
| 2006/0061652 A1 | 3/2006 | Sato | |
| 2006/0227103 A1 | 10/2006 | Kyung-Hoon | |
| 2007/0035530 A1 | 2/2007 | Geest | |
| 2007/0176914 A1* | 8/2007 | Bae et al. | 345/204 |
| 2007/0189599 A1* | 8/2007 | Ryu et al. | 382/154 |
| 2008/0079660 A1* | 4/2008 | Fukushima et al. | 345/7 |
| 2010/0073466 A1* | 3/2010 | Jones et al. | 348/51 |
| 2010/0123772 A1 | 5/2010 | Kawakami | |

FOREIGN PATENT DOCUMENTS

| | | |
|---|---|---|
| CN | 100449572 C | 1/2009 |
| CN | 101739567 A | 6/2010 |
| JP | 09197344 A | 7/1997 |
| JP | 2005164916 A | 6/2005 |
| JP | 2006084963 A | 3/2006 |
| WO | 2005031652 A1 | 4/2005 |
| WO | 2010025458 A1 | 3/2010 |
| WO | 2010068361 A1 | 6/2010 |

OTHER PUBLICATIONS

Office Action for corresponding CN Application No. 201180039233.7, dated Mar. 16, 2015.
Sang-Yi Yi et al., "Moving parallax barrier design for eye-tracking autostereo scopic displays" 3DTV Conference: the True Vision-Capture, Transmission and Display of 3D Video (2008).
Office Action for corresponding CN Application No. 201180039233.7, dated Aug. 14, 2014.
International Search Report for the corresponding PCT Application No. PCT/JP2011/001994, dated Jun. 28, 2011.
International Preliminary Report on Patentability for the corresponding PCT Application No. PCT/JP2011/001994, dated Mar. 12, 2013.
Office Action for corresponding CN Application No. 201180039233.7, dated Aug. 25, 2015.

* cited by examiner

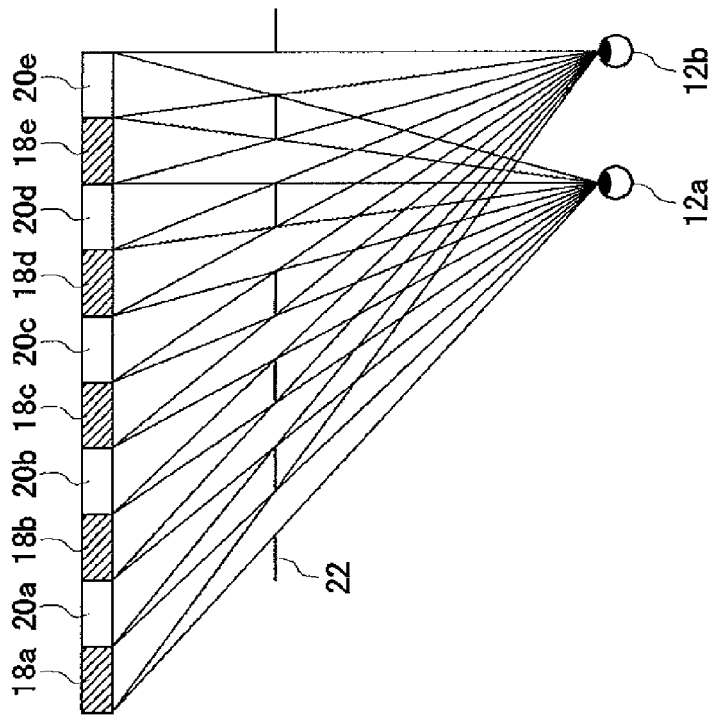
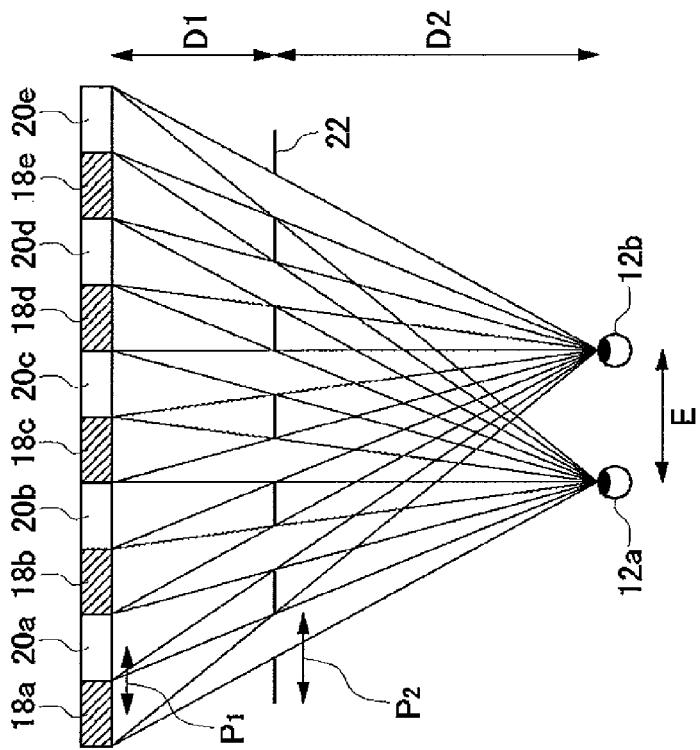

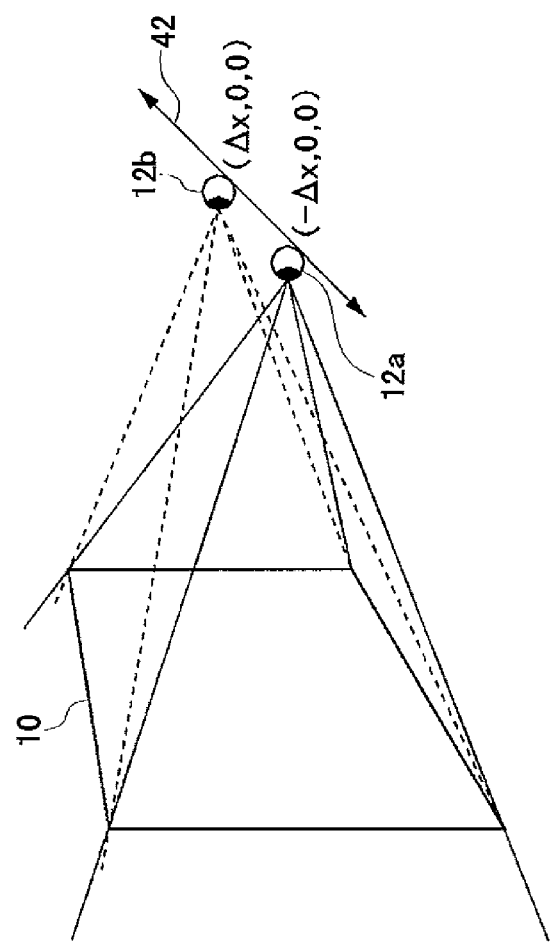
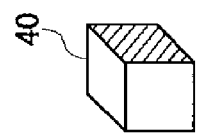
FIG.4

IMAGE DISPLAY DEVICE, IMAGE DISPLAY METHOD, AND IMAGE CORRECTION METHOD

BACKGROUND OF THE INVENTION

1. Field of the Invention

The present invention relates to an image displaying device, an image display method, and an image correction method, and, more particularly, to display and correction of stereoscopic images.

2. Description of the Related Art

Recently, 3-dimensional display devices like three dimensional (3D) television sets capable of presenting stereoscopic images are becoming available to ordinary users. Mobile devices such as cell phones and mobile game devices capable of presenting images stereoscopically are also available on a growing scale so that opportunities have increased for ordinary users to enjoy stereoscopic images.

Meanwhile, explosive popularity of cell phones with a built-in camera initiated an increase in the number of information terminals built with small-sized camera modules. Many mobile devices such as notebook personal computers, tablet PCs, mobile game devices as well as smartphones are now built with camera modules. In particular, many cell phones and mobile game devices are provided with camera modules capable of not only taking pictures but also capturing an image of a user for image-based communication. Many desktop PCs and game devices built with camera modules also allow users to capture images of their faces and use the image for mutual communication.

In this situation, we have become aware that, with mobile devices capable of presenting stereoscopic images and provided with a camera module for capturing an image of the face of a user, it is possible to use information obtained from the face of the user captured in an image to control presentation of stereoscopic images.

SUMMARY OF THE INVENTION

In this background, a purpose of the present invention is to provide a technology of using information obtained from the face of a user viewing a stereoscopic image for presentation of stereoscopic images.

One embodiment to solve the aforementioned problem relates to an image display device. The device comprises: a viewpoint detection unit configured to detect a user viewing a stereoscopic image, including a parallax image for the left eye and a parallax image for the right eye of a subject as viewed from a predetermined position defined as a reference view position, and to track a viewpoint of the detected user; and a motion parallax correction unit configured to determine, if a speed of movement of the viewpoint becomes equal to or higher than a predetermined level, an amount of motion parallax correction for the parallax image for the left eye and for the parallax image for the right eye, respectively, on the basis of an amount of movement of the viewpoint, so as to: generate a stereoscopic image corrected for motion parallax: to generate, if the speed of movement of the viewpoint subsequently becomes lower than a predetermined level, a stereoscopic image by changing the amount of motion parallax correction in steps until the parallax image for the left eye and the parallax image for the right eye return to parallax images as seen from the reference view position: and to output the generated image to a display unit.

Another embodiment of the present invention relates to an image correction method. The method comprises: referring to an amount of movement of a viewpoint of a user viewing a stereoscopic image, including a parallax image for the left eye and a parallax image for the right eye of a subject as viewed from a reference view position so as to correct the stereoscopic image for motion parallax; and decreasing the amount of motion parallax correction in steps so as to return the stereoscopic image to the image as seen from the reference view position, in response to suspension of the movement of the viewpoint.

Still another embodiment of the present invention relates to an image display device. The device comprises: a display unit configured to display an image in a parallax barrier method; a viewpoint detection unit configured to track a viewpoint of a user viewing a stereoscopic image, including a parallax image for the left eye and a parallax image for the right eye of a subject as viewed from a reference view position; and a barrier control unit configured to shift a barrier to a position where stereoscopic view is available when the display unit is viewed from a viewpoint, in synchronization with a movement of the viewpoint.

Yet another embodiment of the present invention relates to The method comprises: displaying an image in a parallax barrier method; tracking, using a processor, a viewpoint of a user viewing a stereoscopic image, including a parallax image for the left eye and a parallax image for the right eye of a subject as viewed from a reference view position; and shifting, using a processor, a barrier to a position where stereoscopic view is available when the subject is viewed from a viewpoint, in synchronization with a movement of the viewpoint.

Optional combinations of the aforementioned constituting elements, and implementations of the invention in the form of methods, apparatuses, systems, computer programs, data structures, and recording mediums may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 2A and 2B illustrate the parallax barrier method;

FIG. 4 schematically shows the relative positions of the reference view positions, the screen, and the object;

DETAILED DESCRIPTION OF THE INVENTION

The invention will now be described by reference to the preferred embodiments. This does not intend to limit the scope of the present invention, but to exemplify the invention.

[Stereoscopic Imaging Using Parallax Image]

Figure 1:
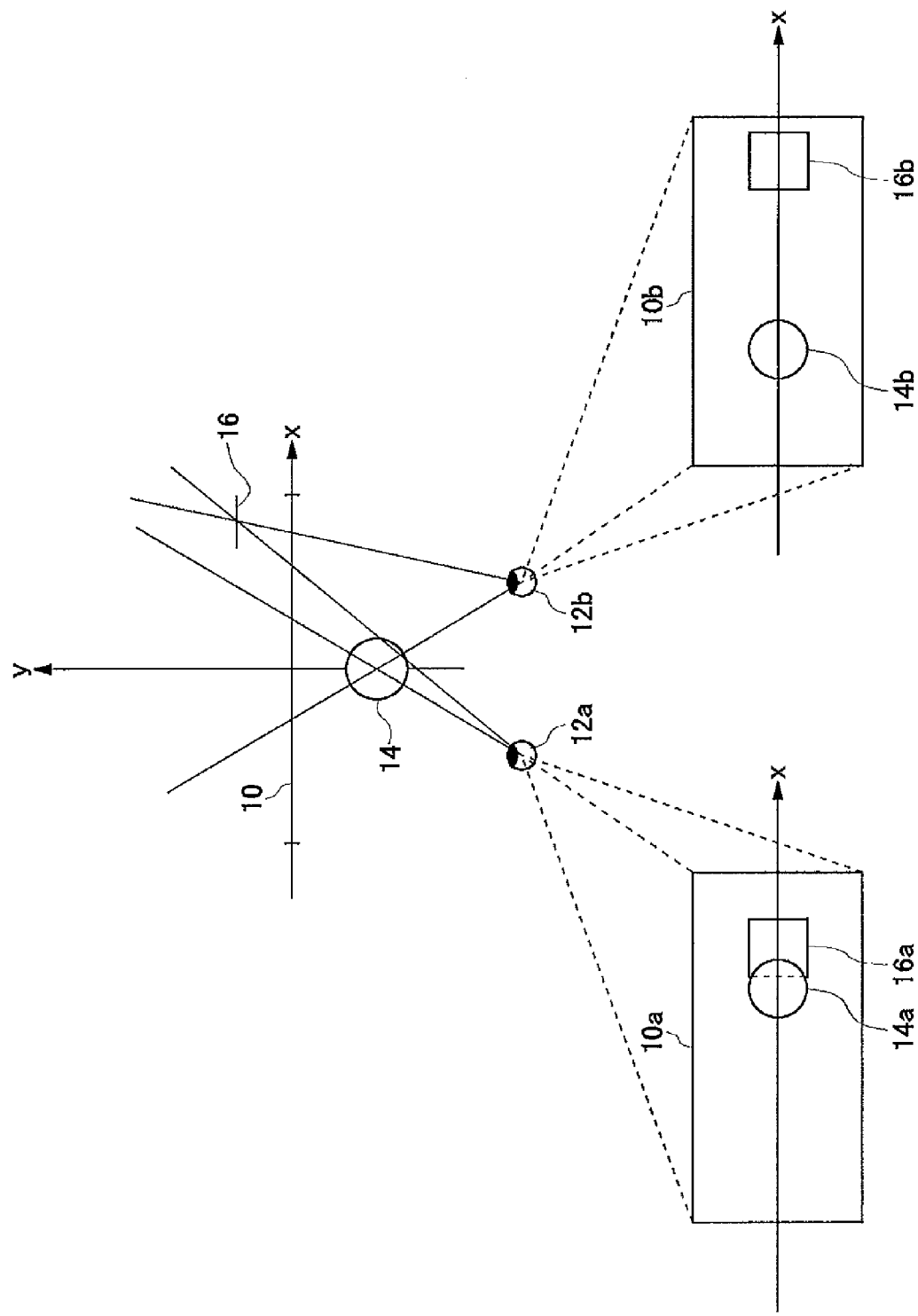
FIG. 1 illustrates parallax images and motion parallax.

FIG. 1 illustrates parallax images and motion parallax. FIG. 1 shows how a screen 10 provided in alignment with the x-axis and perpendicular to the y-axis is viewed from a first viewpoint 12a and a second viewpoint 12b, which are generically referred to as viewpoints 12. A sphere 14 is located more toward the viewpoints 12 than the screen 10. A square 16 is located opposite to the viewpoints 12, sandwiching the screen 10.

A screen 10a and a screen 10b represent images of the sphere 14 and the square 16 observed from the viewpoint 12a and the viewpoint 12b, respectively. When observed from the viewpoint 12a, the square 16 appears partially overlapping the sphere 14. The objects are observed as a sphere 14a and a square 16a on the screen 10a. When observed from the viewpoint 12b, the sphere 14 and the square 16 are observed at locations spaced apart from each other, i.e., observed as a sphere 14a and a square 16b on the screen 10b.

The phenomenon like this in which different images of a given object are seen at different viewpoints is called parallax. Since human eyes are spaced apart by about 6 cm, parallax is produced between an image seen from the left eye and an image seen from the right eye (hereinafter, such images will be referred to as "parallax images"). Human brain is said to recognize the depth of an object using parallax images perceived by the left and right eyes as a clue. For this reason, by projecting a parallax image for the left eye and a parallax image for the right eye to the respective eyes, an image having a depth is perceived by a human being. For example, by projecting the image of the screen 10a of FIG. 1 to the left eye and by projecting the image of the screen 10b to the right eye, the sphere 14 is perceived as if it is in front of the screen 10 and the square 16 is perceived as if it is behind the screen 10.

3-D display devices such as 3-D television sets are devices configured to project a parallax image for the left eye only to the left eye of the user and project a parallax image for the right eye only to the right eye. Various technologies for implementing 3-D display devices are available. One such method uses shutter glasses. In this method, the user wears glasses configured to block or transmit images using a liquid crystal shutter or the like. The user is presented with parallax images as the shutter is opened or closed in synchronization with the parallax image for the left eye and the parallax image for the right eye, which are alternately displayed on a display device in a time-division manner.

[3-D Display of Parallax Barrier Method]

Another method for implementing a 3-D display device is known as a parallax barrier method. FIGS. 2A and 2B illustrate the parallax barrier method.

Referring to FIG. 2A, pixel groups indicated by shades are pixels 18a-18e for the left eye, which are generically referred to as pixels 18 for the left eye. The areas adjacent to the pixels 18 for the left eye are pixels 20a-20e for the right eye, which are generically referred to as pixels 20 for the right eye. It will be assumed that the first viewpoint 12a represents the user's left eye, and the second viewpoint 12b represents the user's right eye. FIG. 2A shows that a barrier 22 is used to block the pixels 20 for the right eye from view from the first viewpoint 12a and to present only the pixels 18 for the right eye to the viewpoint 12a. The barrier 22 is used to block the pixels 18 for the left eye from view from the second viewpoint 12b and present only the pixels 20 for the right eye to the viewpoint 12b. Since the pixel groups are located on the screen of the display device, the barrier 22 is formed as a lattice. The barrier 22 may be physically fixed. Alternatively, the display position or the pitch of the lattice may be controlled by using a liquid crystal.

Given that the distance between the pixel groups and the barrier 22 is D1, the distance between the barrier 22 and the viewpoints 12 is D2, the pixel pitch of the pixel group is P1, the pitch of lattice of the barrier 22 is P2, and the distance between the first viewpoint 12a and the second viewpoint 12b is E, the pixels 20 for the right eye are blocked from view from the first viewpoint 12a and only the pixels 18 for the left eye are presented to the first viewpoint 12a, and the pixels 18 for the left eye are blocked from view from the second viewpoint 12b and only the pixels 20 for the right eye are presented to the second viewpoint 20, if the following expressions (1) and (2) hold.

$$E:P1=D1:D2 \tag{1}$$

$$P2:D1=P1\times 2:D1+D2 \tag{2}$$

FIG. 2A shows that the viewpoints 12 are located in front of the center of the pixel groups, and FIG. 2B shows that the viewpoints 12 are located in front of one end of the pixel groups. As is evident from expressions (1) and (2), if the distance D1 between the pixel group and the barrier 22, the distance D2 between the barrier 22 and the viewpoints 12, and the pixel pitch P1 of the pixel group remain unchanged, the pitch of the lattice of the barrier 22 does not differ in the case shown in FIG. 2B and in the case shown in FIG. 2B. However, the position where the barrier 22 should be provided changes depending on the position of the viewpoints 12.

Many 3-D display devices using shutter glasses or a parallax barrier present images with depth by presenting parallax images to the user. Use of parallax images is premised on observing an object from a fixed position (hereinafter, referred to as "reference view position"). No problems are exhibited while the user is observing a 3-D display device from the viewpoint. However, if the user moves the viewpoint by, for example, moving the head sideways, the mere method of presenting parallax images cannot address a phenomenon called "motion parallax" described later so that the appearance of depth of the presented image is lost.

[Motion Parallax]

The fact that observation of an object from the viewpoint 12a and observation of the same object from the viewpoint 12b located differently provide different views was noted above with reference to FIG. 1. This means that different images of the same object are observed as the viewpoint is moved. Referring to FIG. 1, it will be assumed that the user continues to observe the sphere 14 and the square 16 while moving the viewpoint from the viewpoint 12a to the viewpoint 12b. The screen 10 is fixed and defined as a reference position. The movement of the sphere 14 and the square 16 relative to the screen 10 will be discussed.

The sphere 14a observed at the viewpoint 12a slightly more toward right than the center of the screen 10 will be observed as the sphere 14b slightly more toward left than the center of the screen 10 as the viewpoint is moved to the position of the viewpoint 12b in the positive direction of the x-axis. Meanwhile, the square 16a observed adjacent to the sphere 14a on the screen 10 at the viewpoint 12a will be observed as the square 16b located near the edge in the positive direction of the x-axis of the screen 10.

Thus, as the viewpoint is moved in the positive direction of the x-axis, the sphere 14 located more toward the viewpoint than the screen 10, which is fixed as the reference position, is observed to move in the negative direction of the x-axis relative to the screen 10. Meanwhile, the square 16 located behind the screen 10 as observed from the viewpoint is observed to move in the positive direction of the x-axis relative to the screen 10. In the former case, the object is observed to move in a direction opposite to the movement of the viewpoint so that the movement is defined as "anti-phase" movement. In contrast, in the latter case, the object is observed to move in the same direction as the movement of the viewpoint so that the movement is defined as "in-phase" movement. Whether the object is moved "in-phase" or "anti-phase" and the mount of movement depend on distance between the viewpoint and the object, the distance between the viewpoint and the reference position, and how they compare in the absolute value.

The aforementioned variation in the image of an object dependent on the relative positions of the viewpoint and the object occurring as a result of movement of the viewpoint will be referred to as "motion parallax". Human eyes use information on motion parallax in addition to binocular parallax to recognize the depth. For a user observing a 3-D display device, the screen of the 3-D device represents a fixed frame located at the reference position. Lack of in-phase movement of an object presented behind the screen of the 3-D display device (e.g., an object located at infinity) concurrent with the movement of the viewpoint of the user observing the 3-D display device, on which parallax images are presented, is said to be one cause of impairment in the 3-D world view built inside the brain of the user.

Embodiment

A description will now be given of an embodiment of the present invention. An image display device 100 according to the embodiment is configured to track the viewpoint of a user observing a stereoscopic image created on the premise that the image is observed from a reference view position, to correct the stereoscopic image for motion parallax in accordance with the amount of movement of the viewpoint, and gradually return the stereoscopic image to the pre-correction image when the user's viewpoint comes to a halt. If the 3-D display device observed by the user is of parallax barrier type, the barrier is shifted in accordance with the amount of movement of the viewpoint to a position where stereoscopic view is available when the 3-D display device is viewed from the post-movement viewpoint.

Figure 3:
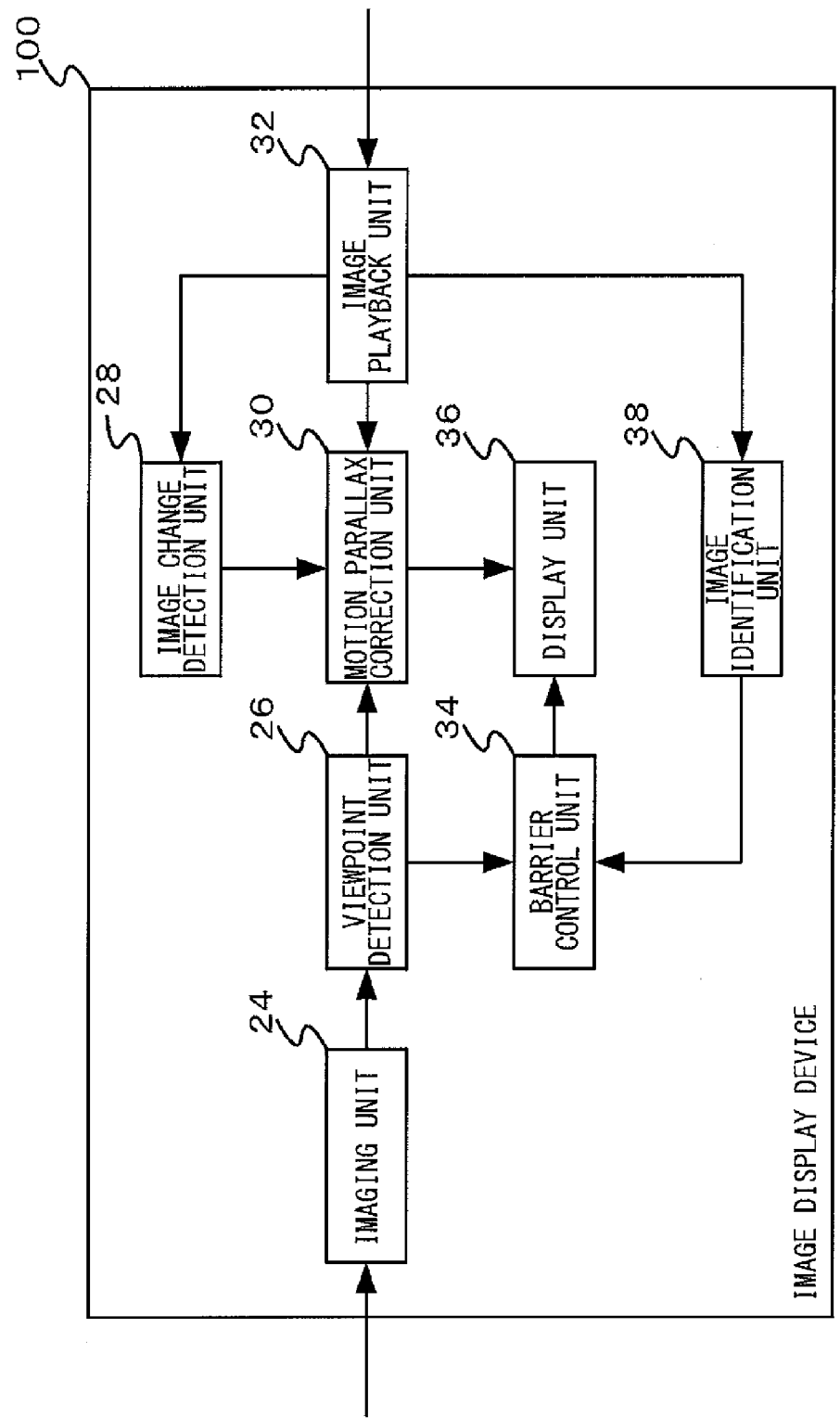
FIG. 3 schematically shows the functions of the image display device according to the embodiment.

FIG. 3 schematically shows the functions of the image display device 100 according to the embodiment. The image display device 100 comprises an imaging unit 24, a viewpoint detection unit 26, an image change detection unit 28, a motion parallax correction unit 30, an image playback unit 32, a barrier control unit 34, a display unit 36, and an image identification unit 38.

The imaging unit 24 is oriented toward the user controlling the image display device 100 to capture an image of a subject which includes the face of the user. The imaging unit 24 is implemented by an imaging device such as charge coupled device (CCD) or a complementary metal oxide semiconductor.

The viewpoint detection unit 26 detects the face of the user from the image of the subject captured by the imaging unit 24 and including the face of the user. Detection of the face of the user can be achieved by using a face detection engine generated by using a known machine learning system such as support vector machine or boosting. This allows the viewpoint detection unit 26 to acquire the position and size of the face of the user, and the number of users observing the image display device 100.

The viewpoint detection unit 26 detects and tracks the eyes of the user based on the detected user's face. Detection and tracking of the user's eyes can also be achieved by using an eyeball detection engine that uses the aforementioned machine learning system. In this way, the viewpoint detection unit 26 tracks the position of the viewpoint of the user on a real time basis.

The image playback unit 32 plays back image content. If the designated content is two-dimensional content, the image playback unit 32 plays back the image unmodified. If the designated content comprises a stereoscopic image including a parallax image for the left eye and a parallax image for the right eye of the subject as viewed from a predetermined position defined as a reference view position, the image playback unit 32 displays images in accordance with the type of the display unit 36.

For example, if the display unit 36 is a display device of parallax barrier type, the image playback unit 32 displays the parallax image for the left eye and the parallax image for the right eye that alternate spatially, isolated from each other. If the display unit 36 is a display device designed for use with shutter glasses, the image playback unit 32 alternately displays the parallax image for the left eye and the parallax image for the right eye in a time division manner.

If the viewpoint detection unit 26 detects a single user, the motion parallax correction unit 30 corrects the stereoscopic image played back by the image playback unit 32 for motion parallax. More specifically, the motion parallax correction unit 30 determines whether the distance of movement of the user's viewpoint detected by the viewpoint detection unit 26 is a predetermined length or less. The "predetermined length" is a measure to determine whether motion parallax correction is useful or not. For example, if the viewpoint of the user moves beyond the size of the display unit 36, the image should be changed extensively in order to correct for motion parallax. Such a correction will, however, distort the image significantly. It should also be noted that, when the viewpoint of the user moves beyond the size of the display unit 36, the user is not supposed to be observing the display unit 36 in many cases.

Therefore, the motion parallax correction unit 30 does not correct for motion parallax if the distance of movement of the user's viewpoint detected by the viewpoint detection unit 26 is a predetermined length or more. The "predetermined length" may be defined experimentally, allowing for the usefulness of motion parallax correction.

Further, if the speed of movement of the user's viewpoint detected by the viewpoint detection unit 26 is equal to or higher than a predetermined level, the motion parallax correction unit 30 determines the amount of motion parallax correction for the parallax image for the left eye and for the parallax image for the right eye, respectively, on the basis of the amount of movement of the viewpoint, so as to generate a stereoscopic image corrected for motion parallax. The "predetermined level" is a level at which the benefit from motion parallax correction pays the associated computational cost and so is a level that serves as a measure to determine whether to perform motion parallax correction. The viewpoint of a user moves slightly even while the user remains still. Extra computational cost will be incurred if motion parallax correction is performed in such cases. Accordingly, the "predetermined level" that serves as a measure to determine whether to perform motion parallax compensation may be defined experimentally, allowing for the benefit from motion parallax and the associated computational cost.

FIG. 4 schematically shows the relative positions of the reference view positions, the screen 10, and an object 40. Referring to FIG. 4, the first viewpoint 12a and the second viewpoint 12b on a line 42 are reference view positions. An orthogonal coordinate system is defined in the space shown in FIG. 4. It will be assumed that the first viewpoint 12a and the second viewpoint 12b are denoted by the coordinates ($\Delta$x, 0, 0) and ($-\Delta$x, 0, 0), respectively.

The stereoscopic image played back the image playback unit 32 is designed to be viewed from the reference view positions shown in FIG. 4. The motion parallax correction unit 30 acquires the amount and direction of movement of the viewpoint detected by the viewpoint detection unit 26. If the viewpoint is detected to be moving in the positive direction of the x-axis and the magnitude of movement is denoted by Mx, the motion parallax correction unit 30 uses projective transformation render on the screen 10 an image seen when the object 40 is observed from the coordinates (Mx+Δx, 0, 0) and (Mx−Δx, 0, 0). If the image played back by the image playback unit 32 is 3-D game content comprising a 3-D model of an object that should be projected, the motion parallax correction unit 30 performs projective transformation by using the 3-D model.

If the image played back by the image playback unit 32 is stereo broadcast or stereoscopic moving images such as those stored in a Blu-ray Disc (registered trademark), the motion parallax correction unit 30 identifies pixels in the parallax image for the left eye and the parallax image for the right eye that match. This is achieved by, for example, using known DP matching. Once the matching pixels in the parallax image for the left eye and the parallax image for the right eye are identified, the motion parallax correction unit 30 computes a depth map of the parallax images by referring to the amount of displacement between matching pixels.

A "depth map" represents information indicating where in the space the pixels composing the parallax images are located. The depth map may be represented using a two-dimensional image. The density of each pixel represents the depth of the pixel.

For example, a point located on the screen 10 shown in FIG. 4 appears at the same position in the parallax image for the left eye and in the parallax image for the right eye. The position of a point located more toward the reference view positions than the screen 10 appears more toward right in the parallax image for the left eye than in the parallax image for the right eye. Conversely, the position of a point located further away from the reference view position than the screen 10 appears more toward left in the parallax image for the left eye than in the parallax image for the right eye. By identifying corresponding pixels in the parallax image for the left eye and in the parallax image for the right eye, information on the depth of the points can be represented in a depth map.

The motion parallax correction unit 30 performs motion parallax correction in accordance with the depth map. More specifically, the motion parallax correction unit 30 acquires the amount and direction of movement of the viewpoint from the viewpoint detection unit 26 and transforms the parallax image such that a point located more toward the reference view position than the screen 10 moves anti-phase relative to the movement of the viewpoint. Conversely, the parallax image is transformed such that a point located opposite to the reference view position relative to the screen 10 moves in-phase relative to the movement of the viewpoint.

According to the process described above, motion parallax correction responsive to the movement of the line of sight is achieved and loss of the experience of depth of stereoscopic images associated with the movement of the viewpoint can be mitigated. However, image transformation associated with motion parallax correction such as this cannot necessarily be said to meet the intent of the content creator for image presentation. It is therefore preferable to return to the image as seen from the reference view position at an early stage in respect of the composition of the image.

Therefore, if the speed of movement of the user's viewpoint acquired from the viewpoint detection unit 26 becomes subsequently lower than the predetermined level, i.e., if the user's viewpoint is considered to become stationary, the motion parallax correction unit 30 generates a stereoscopic image by changing the amount of motion parallax correction in steps until the parallax image for the left eye and the parallax image for the right eye return to parallax images as seen from the reference view position. When the user moves the line of sight, motion parallax correction is performed in accordance with the amount of movement. Once the user stops moving the line of sight, however, the image presented to the user gradually approaches the image as seen from the reference view position and ultimately returns to the image as seen from the reference view position. This makes it possible to establish a balance between mitigation of loss of the experience of depth of the stereoscopic image associated with the movement of the viewpoint and requirement for presenting the image as initially intended by the creator of the content.

The image change detection unit 28 detects a switch in the stereoscopic image by analyzing the image generated by the image playback unit 32. A switch in the image is defined as a change in a characteristic feature of an image which is so large that continuity of moving images is lost. More specifically, a switch occurs when the content played back by the user is switched in its entirety. A switch in the image could also occur within given content. For example, a switch occurs when one stage in game content is switched to another or when the position of a viewpoint that produces the image is changed. A switch also occurs when a scene in movie content is switched to another by editing. The image change detection unit 28 is capable of detecting a switch in the image by receiving a signal from the image playback unit 32 indicating that the user switched the content, or by analyzing and tracking variation in the distribution of luminance values, hue, and saturation of the stereoscopic image generated by the image playback unit 32.

When the image change detection unit 28 detects a switch in the image, the motion parallax correction unit 30 invalidates the amount of motion parallax correction and outputs the stereoscopic image as seen from the reference view position to the display unit, once the image is switched. This is because there is no need to correct the post-switch image for motion parallax correction if the user's viewpoint remains still before and after the image is switched and because the user will not find it uncomfortable even if the image changes extremely before and after the image is switched. The aforementioned scheme is useful in presenting the image as seen from the reference view position to the user at an early stage.

If the display unit 36 is a display device of parallax barrier type, the barrier control unit 34 moves the barrier to a position where stereoscopic view is available when the display unit 36 is viewed from the viewpoint, in synchronization with the movement of the user's viewpoint acquired from the viewpoint detection unit 26. As described above with reference to FIG. 2, the position of the barrier 22 is determined by the position of the viewpoint 12. For example, if the displacement of the viewpoint that the barrier control unit 34 acquired from the viewpoint detection unit 26 is Mx, the barrier 22 should be moved to a position removed from the viewpoint in the direction of movement of the viewpoint by a distance determined by multiplying the amount of movement Mx by D1/(D1+D2), where D1 denotes the distance between the pixel groups and the barrier 22 and D2 denotes the distance between the barrier 22 and the viewpoints 12.

If the barrier 22 is formed of, for example, liquid crystal, the barrier control unit 34 controls the voltage applied to the liquid crystal to displace the barrier 22 to a position where stereoscopic view is available when the display unit 36 is viewed from the user's viewpoint. If the barrier 22 is physically fixed, the barrier control unit 34 controls the actuator such as a servo motor (not shown) to displace the barrier 22.

This allows providing a proper stereoscopic image to the user in synchronization with the movement of the user's viewpoint.

The image identification unit 38 identifies whether the image played back by the image playback unit 32 is a stereoscopic image comprising a parallax image for the left eye and a parallax image for the right eye of a subject, or a two-dimensional image. If the image played back by the image playback unit 32 is a two-dimensional image, the barrier 22 is not necessary. Rather, the barrier 22 blocks the view. Therefore, the barrier control unit 34 causes the barrier 22 to disappear from view if the image viewed by the user and played back by the image playback unit 32 is a two-dimensional image. This can be achieved by configuring the barrier 22 to transmit light if the barrier 22 is formed of liquid crystal, or by displacing the barrier 22 to a position removed from the surface of the display unit 36 if the barrier 22 is physically fixed.

If the result of identification obtained from the image identification unit 38 indicates that the image played back by the image playback unit 32 is a two-dimensional image, the motion parallax correction unit 30 may output the image acquired from the image identification unit 38 to the display unit 36 without subjecting the image to any process. If the image played back by the image playback unit 32 is a two-dimensional image, the parallax image for the left eye and the parallax image for the right eye will be identical. Therefore, the image output to the display unit 36 will be the image acquired from the image identification unit 38 regardless of whether motion parallax correction is performed. Elimination of the process in the motion parallax correction unit 30 is advantageous in that the computational cost and power consumption are reduced.

FIG. 3 shows the functions to implement the image display device 100 according to the embodiment so that other features are omitted from the illustration. The elements depicted in FIG. 3 as functional blocks for performing various processes are implemented by hardware such as a CPU, a main memory, or other LSI's, and by software such as a programs etc., loaded into the main memory. Therefore, it will be obvious to those skilled in the art that the functional blocks may be implemented in a variety of manners by hardware only, software only, or a combination of thereof. By way of example, the image display device 100 according to the embodiment may be a mobile tablet PC or a mobile game device.

Figure 5:
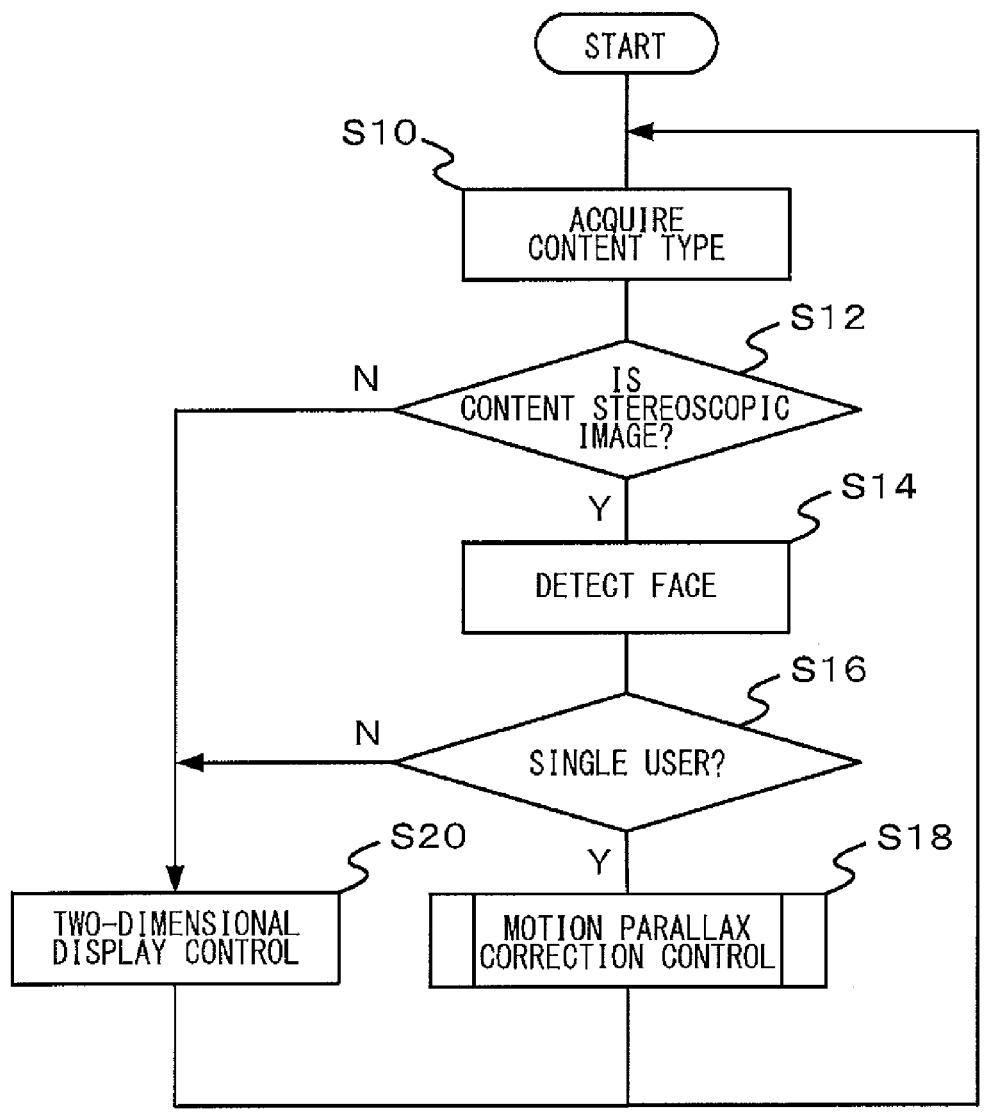
FIG. 5 is a flowchart showing the flow of motion parallax correction process performed by the image display device according to the embodiment.

FIG. 5 is a flowchart showing the flow of motion parallax correction process performed by the image display device 100 according to the embodiment. Referring to the flowchart shown in FIG. 5, the steps in the respective components are denoted by a combination of S (initial letter of Step), which indicates "step", and a numeral. When a determination is made in a step denoted by a combination of S and a numeral and when the result of determination is affirmative, Y (initial letter of Yes) is used to indicate the affirmative determination (e.g., Y in S10). Conversely, when the result of determination is negative, N (initial letter of No) is used to indicate the negative determination (e.g., N in S10). The process of the flowchart is started when the image display device 100 is turned on.

The image identification unit 38 identifies and acquires the type of content played back by the image playback unit 32 (S10). The term "type of content" means information indicating whether the content is a stereoscopic image comprising a parallax image for the left eye and a parallax image for the right eye of a subject or is a two-dimensional image. If the content played back by the image playback unit 32 is identified as a stereoscopic image (Y in S12), the viewpoint detection unit 26 detects the face of a person included in the image acquired from the imaging unit 24 (S14).

If only one person is detected by the viewpoint detection unit 26 (Y in S16), the motion parallax correction unit 30 performs motion parallax correction control (S18). If the content played back by the image playback unit 32 is identified as a two-dimensional image (N in S12), or, if two persons are detected by the viewpoint detection unit 26 (N in S16), the motion parallax correction unit 30 performs two-dimensional display control (S20). More specifically, the motion parallax correction unit 30 outputs the image acquired from the image identification unit 38 to the display unit 36 without subjecting the image to any particular process. The image display device 100 achieves motion parallax correction by running the aforementioned process.

Figure 6:
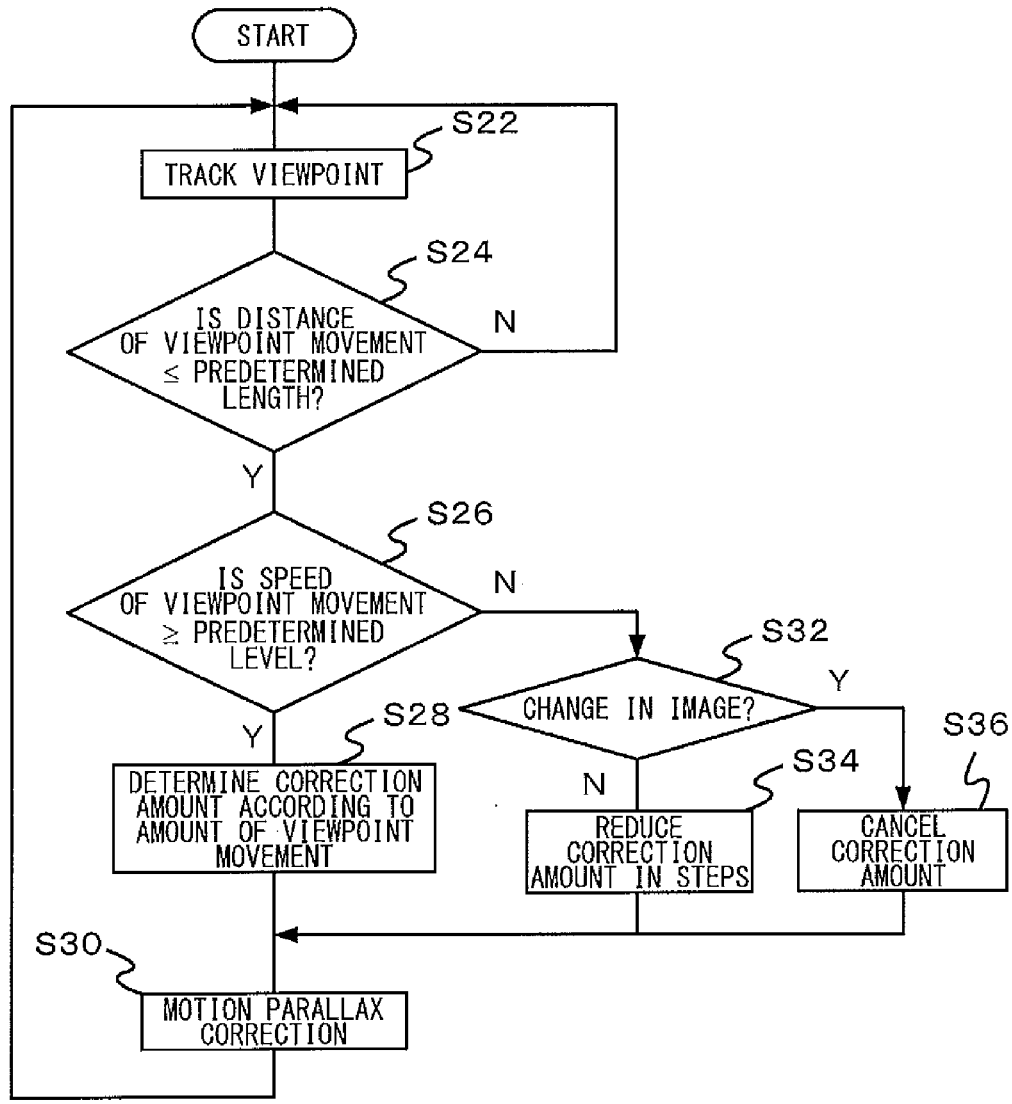
FIG. 6 is a flowchart showing the flow of motion parallax correction control process.

FIG. 6 is a flowchart showing the flow of motion parallax correction control process and shows step S18 of FIG. 5 in further detail.

The viewpoint detection unit 26 detects and tracks the user's eyes by referring to the detected face of the user (S22). If the distance of movement of the user's viewpoint detected by the viewpoint detection unit 26 is a predetermined length or less (Y in S24), and if the speed of movement of the user's viewpoint is equal to or higher than a predetermined level (Y in S26), the motion parallax correction unit 30 determines the amount of motion parallax correction in accordance with the amount of movement of the viewpoint.

If the image played back by the image playback unit 32 is 3-D game content comprising a 3-D model of an object that should be projected, the amount of motion parallax correction is determined by the position of the viewpoint. If the image played back by the image playback unit 32 is stereoscopic moving images, the amount of motion parallax correction is the amount of image transformation determined according to the depth map. The motion parallax correction unit 30 transforms the parallax image in accordance with the amount of correction determined (S30).

If the distance of movement of the viewpoint is determined to be a predetermined length or more in S24 (N in S24), the motion parallax correction unit 30 does not initiate any process and the viewpoint detection unit 26 continues tracking the user's viewpoint. If the sped of movement of the user's viewpoint is determined to be equal to or less than a predetermined level in step S26 (N in S26), the motion parallax correction unit 30 learns from the image change detection unit 28 whether there is a switch in the image. Absent any switch in the image (N in S32), the motion parallax correction unit 30 reduces the current amount of correction in steps (S34). If a switch is detected (Y in S32), the motion parallax correction unit 30 cancels the current amount of correction (S36). By repeating the aforementioned steps, the image display device 100 achieves motion parallax correction.

Figure 7:
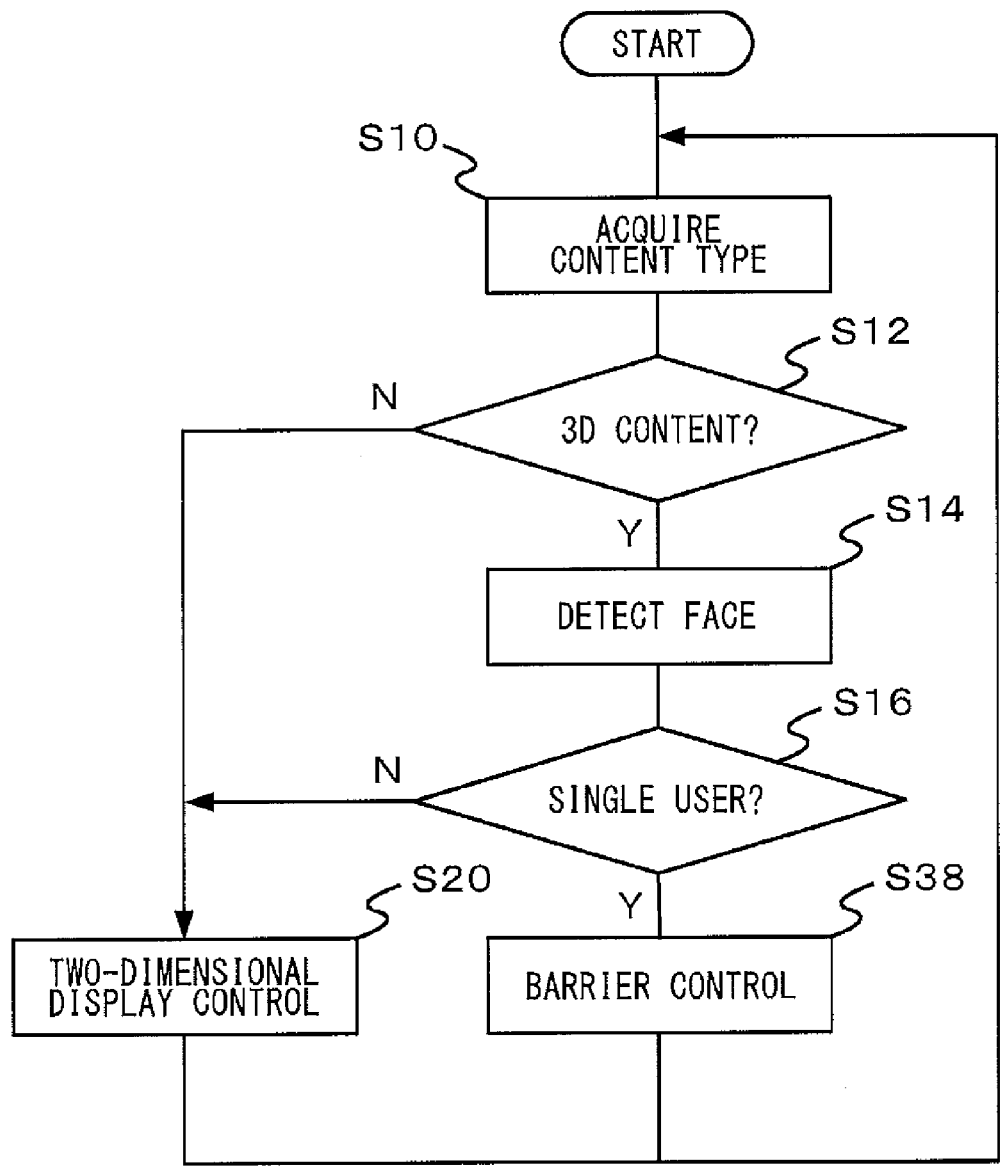
FIG. 7 is flowchart showing the flow of barrier control process performed by the image display device according to the embodiment.

FIG. 7 is flowchart showing the flow of barrier control process performed by the image display device 100 according to the embodiment. The process of the flowchart is a process performed by the image display device 100 in which the display unit 36 is of parallax barrier type.

The image identification unit 38 identifies and acquires the type of content played back by the image playback unit 32 (S10). The term "type of content" means information indicating whether the content is a stereoscopic image comprising a parallax image for the left eye and a parallax image for the right eye of a subject or is a two-dimensional image. If the content played back by the image playback unit 32 is identified as a stereoscopic image (Y in S12), the viewpoint detection unit 26 detects the face of a person included in the image acquired from the imaging unit 24 (S14).

If only one person is detected by the viewpoint detection unit 26 (Y in S16), the barrier control unit 34 performs barrier control (S38). More specifically, the barrier control unit 34 moves the barrier to a position where stereoscopic view is available when the display unit 36 is viewed from the viewpoint, in synchronization with the movement of the user's viewpoint acquired from the viewpoint detection unit 26.

If the content played back by the image playback unit 32 is identified as a two-dimensional image (N in S12), or, if two persons are detected by the viewpoint detection unit 26 (N in S16), the barrier control unit 34 and the motion parallax correction unit 30 perform two-dimensional display control (S20). More specifically, the barrier control unit 34 causes the barrier to disappear from view. Since the barrier, which is unnecessary for playback if the content played back by the image playback unit 32 is identified as a two-dimensional image, is not displayed, the user is presented with an image that is easy to view. Even if the content played back by the image playback unit 32 is identified as a stereoscopic image, the motion parallax correction unit 30 outputs only one of the parallax images to the display unit 36. This can prevent the image from being viewed in a direction in which the stereoscopic image cannot be viewed properly as a plurality of users attempt to view the image on a display device of parallax barrier type.

The operation performed by using the aforementioned features is as follows. When the user observes a stereoscopic image using the image display device 100 according to the embodiment, the motion parallax correction unit 30 corrects the stereoscopic image for motion parallax by referring to the amount of movement of the user's viewpoint tracked by the viewpoint detection unit 26. Once the user's viewpoint becomes stationary, the motion parallax correction unit 30 gradually returns the stereoscopic image to the pre-correction image. If the display unit 36 is of parallax barrier type, the barrier control unit 34 displaces the barrier in accordance with the amount of movement of the user's viewpoint to a position where stereoscopic view is available when the display unit 36 is viewed from the post-movement viewpoint.

As described above, the embodiment provides a technology of using information obtained from the face of the user viewing a stereoscopic image for presentation of the stereoscopic image.

Described above is an explanation based on an exemplary embodiment. The embodiment is intended to be illustrative only and it will be obvious to those skilled in the art that various modifications to constituting elements and processes could be developed and that such modifications are also within the scope of the present invention.

The above description assumes that the viewpoint detection unit 26 tracks the user's viewpoint by detecting the eyes of the user. Alternatively, feature points other than the eyes may be detected to track the viewpoint. For example, the tip of the nose of the user may be defined as the user's viewpoint so that the nose may be detected accordingly. Still alternatively, an artificial object such as the frame of eyeglasses may be tracked.

In particular, if the display unit 36 is a 3D TV set in which polarization glasses or shutter glasses are used, it is guaranteed that the user observing the display unit 36 wears glasses. The movement of the viewpoint of the user using such a display unit may be detected by mounting a detection marker (e.g., a light emitting diode) on the glasses worn by the user. Alternatively, if the glasses worn by the user are shutter glasses, the movement of the viewpoint may be detected by detecting the opening or closing of the shutter glasses. In either case, the viewpoint detection unit 26 detects the viewpoint by analyzing an image acquired from the imaging unit 24 and containing the glasses worn by the user. Glasses are standardized artifacts and so are advantageous in reducing a detection failure as compared to the case of detecting the eyes of the user.

What is claimed is:

1. An image display device comprising:
    a viewpoint detector operating to: (1) detect a user viewing a stereoscopic image, including a parallax image for the left eye and a parallax image for the right eye of a subject as viewed from a predetermined position defined as a reference view position, which is a fixed viewpoint at which no motion parallax is present, (2) acquire a position and size of a face of the user, (3) track eyes of the user, (4) determine a viewpoint of the user using the acquired position and size of the face of the user, and the tracking of the eyes of the user, and (5) track the viewpoint of the user; and
    a motion parallax calculator operating to determine an amount of motion parallax correction to apply to the parallax image for the left eye and for the parallax image for the right eye, respectively, as a function of an amount of movement of the viewpoint determined by tracking the viewpoint of the user,
    wherein the amount of motion parallax correction is computed for the parallax image for the left eye and the parallax image for the right eye when the speed of movement of the viewpoint of the user is equal to or higher than a predetermined level,
    wherein the amount of motion parallax correction for the parallax image for the left eye and the parallax image for the right eye is determined to be a reference amount, in accordance with the reference view position at which no motion parallax is present, when the speed of movement of the viewpoint of the user remains below the predetermined level for a sufficient period of time,
    wherein the amount of motion parallax correction computed for the parallax image for the left eye and the parallax image for the right eye is gradually reduced to the reference amount during a period of time when the speed of movement of the viewpoint of the user falls below the predetermined level but has not reached the sufficient time period,
    a display operating to display the stereoscopic image corrected for motion parallax by the amount of motion parallax correction computed as a function of the speed of movement of the viewpoint of the user and applied to the parallax image for the left eye and the parallax image for the right eye.

2. The image display device according to claim 1, further comprising:
    an image change detection unit configured to detect a switch in an image by analyzing the stereoscopic image,
    wherein, if the image change detection unit detects a switch in the image, the motion parallax correction unit invalidates the amount of motion parallax correction computed and outputs to the display unit the stereoscopic image as seen from the reference view position, following the switch in the image.

3. The image display device according to claim 1, wherein the motion parallax correction unit performs motion parallax correction if the viewpoint detection unit detects that a single user is viewing the stereoscopic image.

4. An image correction method comprising:
    detecting a user viewing a stereoscopic image, including a parallax image for the left eye and a parallax image for the right eye of a subject as viewed from a predetermined position defined as a reference view position, which is a fixed viewpoint at which no motion parallax is present;
acquiring a position and size of a face of the user;
tracking eyes of the user;
determining a viewpoint of the user using the acquired position and size of the face of the user, and the tracking of the eyes of the user;
tracking the viewpoint of the user;
determining an amount of motion parallax correction to apply to the parallax image for the left eye and for the parallax image for the right eye, respectively, as a function of an amount of movement of the viewpoint determined by tracking the viewpoint of the user,
computing the amount of motion parallax for the parallax image for the left eye and the parallax image for the right eye when the speed of movement of the viewpoint of the user is equal to or higher than a predetermined level,
computing the amount of motion parallax correction for the parallax image for the left eye and the parallax image for the right eye is determined to be a reference amount, in accordance with the reference view position at which no motion parallax is present, when the speed of movement of the viewpoint of the user remains below the predetermined level for a sufficient period of time,
gradually reducing the amount of motion parallax correction for the parallax image for the left eye and the parallax image for the right eye to the reference amount during a period of time when the speed of movement of the viewpoint of the user falls below the predetermined level but has not reached the sufficient time period,
displaying the stereoscopic image corrected for motion parallax by the amount of motion parallax correction computed as a function of the speed of movement of the viewpoint of the user and applied to the parallax image for the left eye and the parallax image for the right eye.

5. A non-transitory computer readable storage medium with an executable program stored thereon, wherein a processor performs actions when the program is executed, comprising:
detecting a user viewing a stereoscopic image, including a parallax image for the left eye and a parallax image for the right eye of a subject as viewed from a predetermined position defined as a reference view position, which is a fixed viewpoint at which no motion parallax is present;
acquiring a position and size of a face of the user;
tracking eyes of the user;
determining a viewpoint of the user using the acquired position and size of the face of the user, and the tracking of the eyes of the user;
tracking the viewpoint of the user;
determining an amount of motion parallax correction to apply to the parallax image for the left eye and for the parallax image for the right eye, respectively, as a function of an amount of movement of the viewpoint determined by tracking the viewpoint of the user,
computing the amount of motion parallax for the parallax image for the left eye and the parallax image for the right eye when the speed of movement of the viewpoint of the user is equal to or higher than a predetermined level,
computing the amount of motion parallax correction for the parallax image for the left eye and the parallax image for the right eye is determined to be a reference amount, in accordance with the reference view position at which no motion parallax is present, when the speed of movement of the viewpoint of the user remains below the predetermined level for a sufficient period of time,
gradually reducing the amount of motion parallax correction for the parallax image for the left eye and the parallax image for the right eye to the reference amount during a period of time when the speed of movement of the viewpoint of the user falls below the predetermined level but has not reached the sufficient time period,
displaying the stereoscopic image corrected for motion parallax by the amount of motion parallax correction computed as a function of the speed of movement of the viewpoint of the user and applied to the parallax image for the left eye and the parallax image for the right eye.

6. An image display device comprising:
a display unit configured to display an image in a parallax barrier method;
a viewpoint operating to: (1) detect a user viewing a stereoscopic image, including a parallax image for the left eye and a parallax image for the right eye of a subject as viewed from a predetermined position defined as a reference view position, which is a fixed viewpoint at which no motion parallax is present, (2) acquire a position and size of a face of the user, (3) track eyes of the user, (4) determine a viewpoint of the user using the acquired position and size of the face of the user, and (5) track the viewpoint of the user;
a motion parallax calculator operating to determine an amount of motion parallax correction to apply to the parallax image for the left eye and for the parallax image for the right eye, respectively, as a function of an amount of movement of the viewpoint determined by tracking the viewpoint of the user,
wherein the amount of motion parallax correction is computed for the parallax image for the left eye and the parallax image for the right eye when the speed of movement of the viewpoint of the user is equal to or higher than a predetermined level,
wherein the amount of motion parallax correction for the parallax image for the left eye and the parallax image for the right eye is determined to be a reference amount, in accordance with the reference view position at which no motion parallax is present, when the speed of movement of the viewpoint of the user remains below the predetermined level for a sufficient period of time,
wherein the amount of motion parallax correction computed for the parallax image for the left eye and the parallax image for the right eye is gradually reduced to the reference amount during a period of time when the speed of movement of the viewpoint of the user falls below the predetermined level but has not reached the sufficient time period; and
a barrier control unit configured to shift a barrier to a position where a stereoscopic view of the stereoscopic image is available when the display unit is viewed in synchronization with a movement of the viewpoint obtained by the tracking of the viewpoint of the user.

7. The image display device according to claim 6, further comprising:
an image identification unit configured to identify whether an image viewed by a user is a stereoscopic image, including a parallax image for the left eye and a parallax image for the right eye of a subject, or a two-dimensional image,
wherein the barrier control unit disables the barrier if the image viewed by the user is a two-dimensional image.

8. An image display method comprising:
displaying an image in a parallax barrier method;
detecting a user viewing a stereoscopic image, including a parallax image for the left eye and a parallax image for the right eye of a subject as viewed from a predetermined position defined as a reference view position, which is a fixed viewpoint at which no motion parallax is present;

acquiring a position and size of a face of the user;

tracking eyes of the user;

determining a viewpoint of the user using the acquired position and size of the face of the user, and the tracking of the eyes of the user;

tracking the viewpoint of the user;

determining an amount of motion parallax correction to apply to the parallax image for the left eye and for the parallax image for the right eye, respectively, as a function of an amount of movement of the viewpoint determined by tracking the viewpoint of the user, computing the amount of motion parallax for the parallax image for the left eye and the parallax image for the right eye when the speed of movement of the viewpoint of the user is equal to or higher than a predetermined level, computing the amount of motion parallax correction for the parallax image for the left eye and the parallax image for the right eye is determined to be a reference amount, in accordance with the reference view position at which no motion parallax is present, when the speed of movement of the viewpoint of the user remains below the predetermined level for a sufficient period of time, gradually reducing the amount of motion parallax correction for the parallax image for the left eye and the parallax image for the right eye to the reference amount during a period of time when the speed of movement of the viewpoint of the user falls below the predetermined level but has not reached the sufficient time period; and shifting, using a processor, a barrier to a position where a stereoscopic view of the stereoscopic image is available when the subject is viewed in synchronization with a movement of the viewpoint obtained by the tracking of the viewpoint of the user.

9. A non-transitory computer readable storage medium with an executable program stored thereon, wherein a processor performs actions when the program is executed, comprising:

displaying a stereoscopic image in a parallax barrier method;

detecting a user viewing a stereoscopic image, including a parallax image for the left eye and a parallax image for the right eye of a subject as viewed from a predetermined position defined as a reference view position, which is a fixed viewpoint at which no motion parallax is present;

acquiring a position and size of a face of the user;

tracking eyes of the user;

determining a viewpoint of the user using the acquired position and size of the face of the user, and the tracking of the eyes of the user;

tracking the viewpoint of the user;

determining an amount of motion parallax correction to apply to the parallax image for the left eye and for the parallax image for the right eye, respectively, as a function of an amount of movement of the viewpoint determined by tracking the viewpoint of the user, computing the amount of motion parallax for the parallax image for the left eye and the parallax image for the right eye when the speed of movement of the viewpoint of the user is equal to or higher than a predetermined level, computing the amount of motion parallax correction for the parallax image for the left eye and the parallax image for the right eye is determined to be a reference amount, in accordance with the reference view position at which no motion parallax is present, when the speed of movement of the viewpoint of the user remains below the predetermined level for a sufficient period of time, gradually reducing the amount of motion parallax correction for the parallax image for the left eye and the parallax image for the right eye to the reference amount during a period of time when the speed of movement of the viewpoint of the user falls below the predetermined level but has not reached the sufficient time period; and shifting a barrier to a position where a stereoscopic view of the stereoscopic image is available when the subject is viewed in synchronization with a movement of the viewpoint obtained by the tracking of the viewpoint of the user.

* * * * *